United States Patent
Wang

(10) Patent No.: US 8,742,729 B2
(45) Date of Patent: Jun. 3, 2014

(54) RECHARGEABLE BATTERY

(75) Inventor: Lee Z. Wang, Hsinchu (TW)

(73) Assignee: Flashsilicon Incorporation, Diamond Bar, CA (US)

( * ) Notice: Subject to any disclaimer, the term of this patent is extended or adjusted under 35 U.S.C. 154(b) by 305 days.

(21) Appl. No.: 13/154,657

(22) Filed: Jun. 7, 2011

(65) Prior Publication Data

US 2012/0313590 A1 Dec. 13, 2012

(51) Int. Cl.
*H02J 7/00* (2006.01)

(52) U.S. Cl.
USPC ............................. 320/137; 320/166; 320/167

(58) Field of Classification Search
USPC ............................. 320/166, 167; 307/109, 110
See application file for complete search history.

(56) References Cited

U.S. PATENT DOCUMENTS

| | | | |
|---|---|---|---|
| 5,168,206 A | 12/1992 | Jones | |
| 5,600,186 A * | 2/1997 | Song et al. | 307/125 |
| 6,809,433 B2 * | 10/2004 | Nozu | 307/109 |
| 7,218,076 B2 | 5/2007 | Cheiky et al. | |
| 7,612,603 B1 * | 11/2009 | Petricek et al. | 327/530 |
| 7,777,456 B2 * | 8/2010 | Morita et al. | 320/166 |
| 7,911,187 B2 | 3/2011 | Lai et al. | |
| 8,063,611 B2 * | 11/2011 | Morita et al. | 320/148 |
| 8,148,954 B1 * | 4/2012 | Kehlstadt et al. | 320/166 |
| 2003/0020435 A1 * | 1/2003 | Desprez et al. | 320/166 |
| 2004/0036449 A1 * | 2/2004 | Bean et al. | 320/166 |
| 2006/0061328 A1 * | 3/2006 | Trosper | 320/112 |
| 2007/0194759 A1 * | 8/2007 | Shimizu et al. | 320/166 |
| 2007/0279010 A1 * | 12/2007 | Okamura et al. | 320/166 |
| 2008/0143301 A1 * | 6/2008 | Bartilson | 320/167 |
| 2008/0169791 A1 * | 7/2008 | Daio | 320/166 |
| 2008/0253196 A1 * | 10/2008 | Yip | 365/185.23 |
| 2009/0033293 A1 | 2/2009 | Xing et al. | |
| 2009/0134851 A1 * | 5/2009 | Takeda et al. | 323/234 |
| 2009/0251099 A1 | 10/2009 | Brantner et al. | |
| 2009/0289607 A1 * | 11/2009 | Mentelos | 320/166 |
| 2010/0060244 A1 * | 3/2010 | Kurokawa et al. | 320/166 |

* cited by examiner

*Primary Examiner* — Drew A Dunn
*Assistant Examiner* — Michael Dibenedetto
(74) *Attorney, Agent, or Firm* — Muncy, Geissler, Olds & Lowe, P.C.

(57) ABSTRACT

A rechargeable battery is disclosed. The rechargeable battery of the invention includes a high density capacitor and an integrated circuit. The high density capacitor is connected to a ground terminal and a first node carrying a first voltage. The integrated circuit includes a band gap circuit, a first detecting unit, a voltage divider, a second detecting unit and at least one low dropout voltage regulator. The band gap circuit generates a band gap voltage according to the first voltage. The first detecting unit measures the first voltage and determines whether to apply an input charging voltage to the high density capacitor. The voltage divider is connected in parallel with the high density capacitor and has a second node carrying a second voltage. The second detecting unit measures the second voltage according to the band gap voltage and determines whether to connect a third node to the first node. Each low dropout voltage regulator is connected to the third node and generates a specified voltage output and a specified current output according to the band gap voltage and the first voltage.

16 Claims, 4 Drawing Sheets

RECHARGEABLE BATTERY

BACKGROUND (a) Technical Field

This invention relates to a rechargeable battery, and in particular, the battery includes high density capacitors for storing electrical charges and circuitries for battery charging and discharging functions.

(b) Description of the Related Art

Various rechargeable batteries are known in the art. These batteries include chemical accumulator based such as lithium-ion, nickel-cadmium, nickel-metal hydride, and so forth. The chemical accumulators basically comprise two electrode plates and electrolyte in between the plates. These rechargeable batteries have limited operational lifetime due to irreversible chemical changes that gradually take place during charging and discharging. Since these batteries contain toxic chemical they are not environmental friendly after the battery life for disposal.

In recent development of magnetic capacitors by Northern Lights Semiconductor Corporation (NLSC), high capacitance density has been demonstrated in magnetic capacitors. With the high capacitance density and low leakage current, magnetic capacitors open up a brand new field of applications for electrical power storage and management. For instance, in U.S. Pat. No. 7,911,187, Lai and Fong taught to apply magnetic capacitors for passive regulation and protection of an electronic subsystem in System-in a-Package (SIP).

In this invention, we fabricate rechargeable batteries with high density capacitors and Integrated Circuit (IC) on semiconductor substrate. The battery size and weight are dramatically reduced with very high storing power density. For instance, the charging capacity of a rechargeable lithium-ion battery available in mobile devices is around 2000 mA-hour, equivalent to 7200 Coulomb. For a charging voltage of 5V and maximum discharging voltage of 3 V in one of our designs, the areas of the magnetic capacitor are only 36 mm$^2$ for a magnetic capacitor with capacitance density of about 100 µF/µm$^2$, where areas=7200 Coulomb/(5V–3V) (charging voltage–maximum discharging voltage)/100 F/mm$^2$ (capacitance density). The weights of the companion ICs and magnetic capacitors are around the same weights of a common IC chip with the compatible chip sizes, which weights less than a grain.

In contrast to chemical accumulator based rechargeable battery, the rechargeable batteries are environmental friendly because that there are no toxic chemical elements in the batteries. Also due to near infinite numbers of charging-discharging cycles of the magnetic capacitors, the rechargeable batteries exhibit almost infinite number of rechargeable cycle life. The self-discharging rate of the conventional chemical accumulator rechargeable batteries, for example, lithium-ion batteries, are around 8% of its storing capacity per month. Because the total leakage current of the magnetic capacitors and IC with a careful design can be down to ~several µA, the newly designed rechargeable batteries can have very long cell charge storage life up to tens of years.

In another aspect of the present rechargeable batteries, the rechargeable batteries can provide multiple voltage sources for various current requirements. Many electronic systems require multiple power sources for various sub-system functions. For example, a mobile device may have several sub-systems: Micro-Processor-Units (CPU), memory units, Radio Frequency (RF) units, display and human interface units. All the sub-system units may require various voltages and currents. The conventional rechargeable batteries can only provide a single power source. To meet the multiple power requirements for an electronic system, a companion power IC with multiple outputs and a battery are usually required. The present rechargeable batteries can provide multiple power sources for the entire power requirements of electronic systems in one single battery.

BRIEF SUMMARY

The rechargeable battery 100A comprises an integrated circuit (IC) 180A on a silicon semiconductor (not shown) and a charging capacitor $C_S$. The IC 180A comprises two transmission gates 151, 152, two voltage comparators 101, 102, a band gap circuitry 120, a voltage divider 160a, and a plurality of Low-Drop-Out (LDO) voltage regulators 131-13N (N>=1) as shown in FIG. 1A. One terminal of the transmission gate 151 is connected to the input terminal receiving the input charging voltage $V_{chg}$, and the other terminal of the transmission gate 151 is connected to the positive terminal X of the charging capacitor $C_S$. The control signals of the transmission gate 151 come from the output of the first voltage comparator 101. When the input charging voltage $V_{chg}$ is detected to be greater than the voltage $V_X$ at the positive terminal X of the charging capacitor $C_S$ the outputs of the first voltage comparator 101 will send out a signal to turn on the transmission gate switch 151. Thus the charging capacitor $C_S$ starts to charge.

A band gap circuitry 120 generates a referencing voltage (or a band gap voltage) $V_{BG}$ around 1.2 volts as shown in FIG. 2. The band gap circuitry 120 is biased by the high density capacitor Cs. The voltage $V_X$ at the high density capacitor node X is divided by the voltage divider (160a or 160b). In the embodiment of FIG. 1A, the voltage divider 160a includes two capacitors $C_1$ and $C_2$. The divided voltage $V_{Y1}$ at the node Y1 between two capacitors given by $[V_X \times (C_1/(C_1+C_2))]$ is fed into the input terminal of the second voltage comparator 102 to compare with the band gap voltage $V_{BG}$, in an alternative embodiment of FIG. 1B, the voltage divider 160b includes two resistors $R_5$ and $R_6$. Correspondingly, the divided voltage $V_{Y2}$ at the node Y2 between two resistors given by $[V_X \times (R_6/(R_5+R_6))]$ is fed into the input terminal of the second voltage comparator 102 to compare with the band gap voltage $V_{BG}$.

It can be designed that when the voltage $V_X$ at the charging capacitor node X discharges to a predetermined cut-off voltage $V_{cmin}$, the output signals of the second voltage comparator 102 switches "off" the transmission gate 152 to disconnect the charging capacitor $C_S$ (or the node X) from the main power supply $V_Z$ (or the node Z), where $V_Z$ is the main power supply for all the voltage regulators 131-13N. When the voltage $V_X$ decreases to the predetermined cut-off voltage $V_{cmin}$, all the voltage regulators 131-13N stop providing voltage power. This function is to assure the outputs of the rechargeable battery (100A, 100B) meet their voltage and current capacity specifications. Below this voltage level $V_{cmin}$, the rechargeable battery (100A, 100B) would require to be recharged to recover their power supply functions.

BRIEF DESCRIPTION OF THE DRAWINGS

For a better understanding of the present invention and to show how it may be carried into effect, reference will now be made to the following drawings, which show the preferred embodiments of the present invention, in which.

DETAILED DESCRIPTION

The present invention includes methods and schematics to fabricate a rechargeable battery based on Integrated Circuit (IC) and high capacitance density capacitors. Those of ordinary skill in the art will immediately realize that the embodiment of the present invention described herein in the context of methods and schematics are illustrative only and are not intended to be in any way limiting. Other embodiments of the present invention will readily suggest themselves to such skilled persons having the benefits of this disclosure.

Figure 1A:
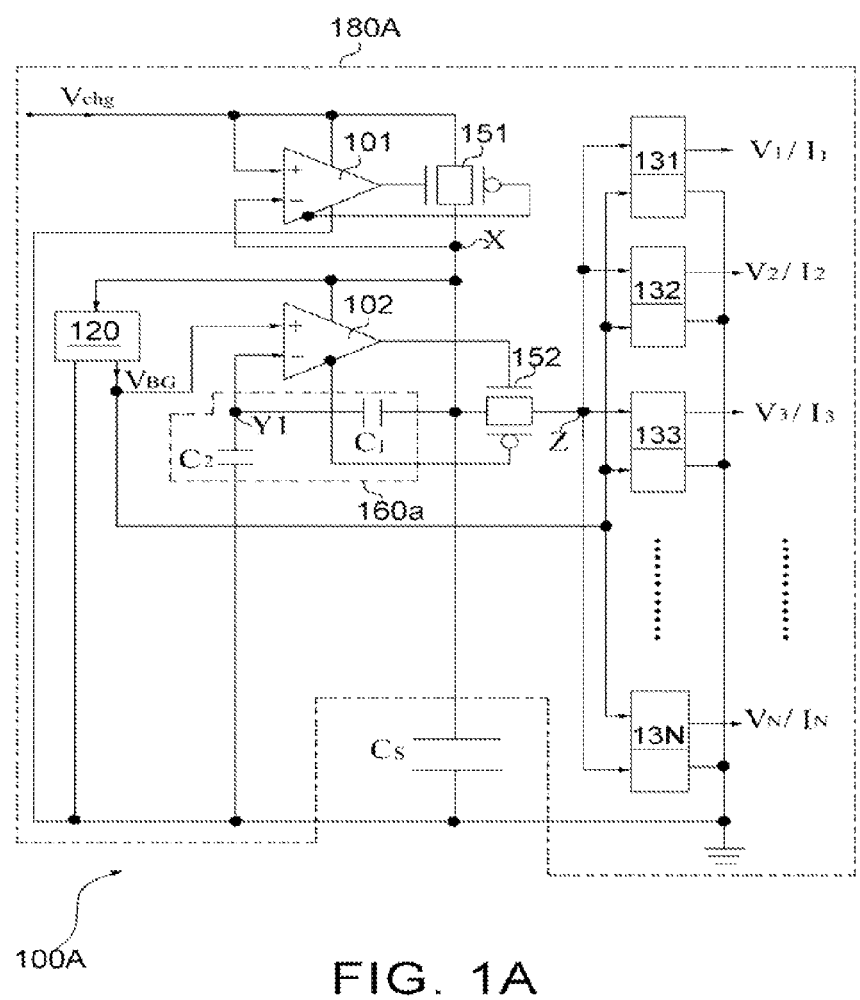
FIG. 1A is a schematic diagram of a rechargeable battery according to an embodiment of the invention.
Figure 1B:
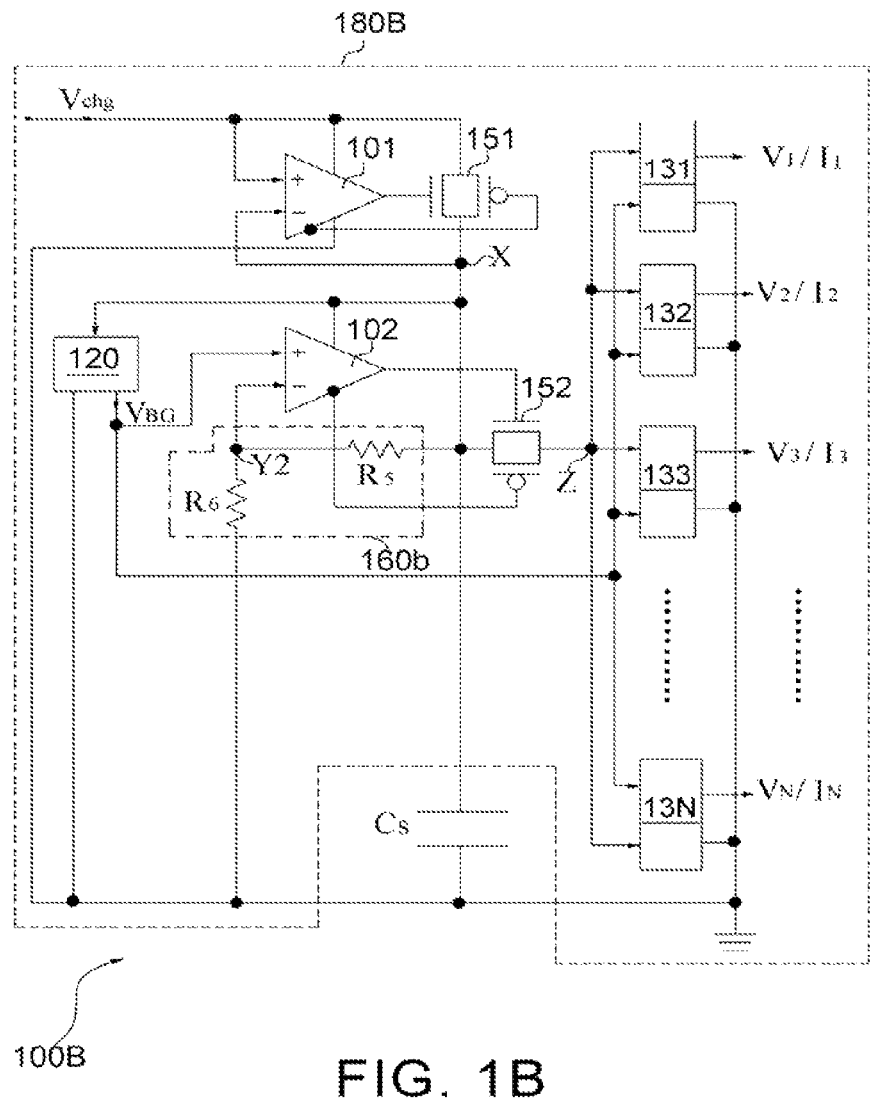
FIG. 1B is a schematic diagram of a rechargeable battery according to another embodiment of the invention.

As shown in FIG. 1A, a rechargeable battery 100A comprises an integrated circuit (IC) 180A and a high density capacitor $C_S$. As shown in FIG. 1B, a rechargeable battery 100B comprises an integrated circuit (IC) 180B and a high density capacitor $C_S$. The IC (180A, 180B) is manufactured on silicon semiconductor using the conventional semiconductor process technology. The high density capacitor $C_S$ can be manufactured separately in a different substrate or integrated the capacitor process technology in the conventional semiconductor process technology on a same silicon substrate. For the former for a separated IC and a separated capacitor, the high density capacitor $C_S$ and the IC (180A or 180B) can be connected and bonded into a single package.

The IC 180A includes two voltage comparators 101, 102, two transmission gates 151, 152, a band gap circuitry 120, a voltage divider 160a, and a plurality of Low-Drop-Out (LDO) voltage regulators 131-13N (N>=1). The IC 180B includes two voltage comparators 101, 102, two transmission gates 151, 152, a band gap circuitry 120, a voltage divider 160b, and a plurality of Low-Drop-Out (LDO) voltage regulators 131-13N (N>=1). It should be noted that the above two transmission gates are only utilized as embodiment and are not limitations of the invention. In the actual implementations, any switches can be used and this falls in the scope of the invention. The first voltage comparator 101 is used to compare the input charging voltage $V_{chg}$ with the voltage $V_X$ at the node X of the charging capacitor $C_S$. When an applied charging voltage $V_{chg}$ is greater than the voltages $V_X$, the transmission gates 151 is switched "on" and the charging capacitor $C_S$ begins to charge. When a lower charging voltage $V_{chg}$ is provided to the battery (100A, 100B), the transmission gates 151 is switched "off" to prevent charging back to the charging source. When the rechargeable battery (100A, 100B) is fully charged, the voltage $V_X$ reaches the charging voltage $V_{chg}$.

The second voltage comparator 102 is used to compare the voltage ($V_{Y1}$ or $V_{Y2}$), through a voltage divider (160a, 160b) with the band gap voltage $V_{BG}$. When the charging capacitor $C_S$ discharges and the voltage $V_X$ finally decreases to a predetermined cut-off voltage $V_{cmin}$, the second voltage comparator 102 sends an output signal to switch off the transmission gates 152. At this moment, the voltage $V_{Y1}=[V_{cmin} \times (C_1/(C_1+C_2))]$ is less than $V_{BG}$ in the embodiment of FIG. 1A where the voltage $V_{Y2}=[V_{cmin} \times (R_6/(R_5+R_6))]$ is less than $V_{BG}$ in the embodiment of FIG. 1B. The node X that provides the power source for all the voltage regulators 131-13N is disconnected from the node Z. The battery (100A, 100B) stops providing voltage power supply. Throughout the specification and claims, the term "cut-off voltage $V_{cmin}$" refers to a minimum of the voltage $V_X$ at the node X that the node X remains connected with the node Z. The total charges released to power the battery is given by $Q_B = C(V_{chg} - V_{cmin})$ after the charging capacitor $C_S$ is fully charged with a final reaching voltage $V_{chg}$, where C denotes the capacitance of the charging capacitor $C_S$. For a size of 36 mm$^2$ magnetic capacitor with capacitance of 3600 F, and 5 volts of charging voltage $V_{chg}$ and 3 volts of cut-off voltage $V_{cmin}$, respectively, the total charges can be released from the rechargeable battery (100A, 100B) for powering is 7200 Coulomb, equivalent to 2000 mA hour. This charging quantity is already superior to most of rechargeable batteries available in the market.

Figure 2:
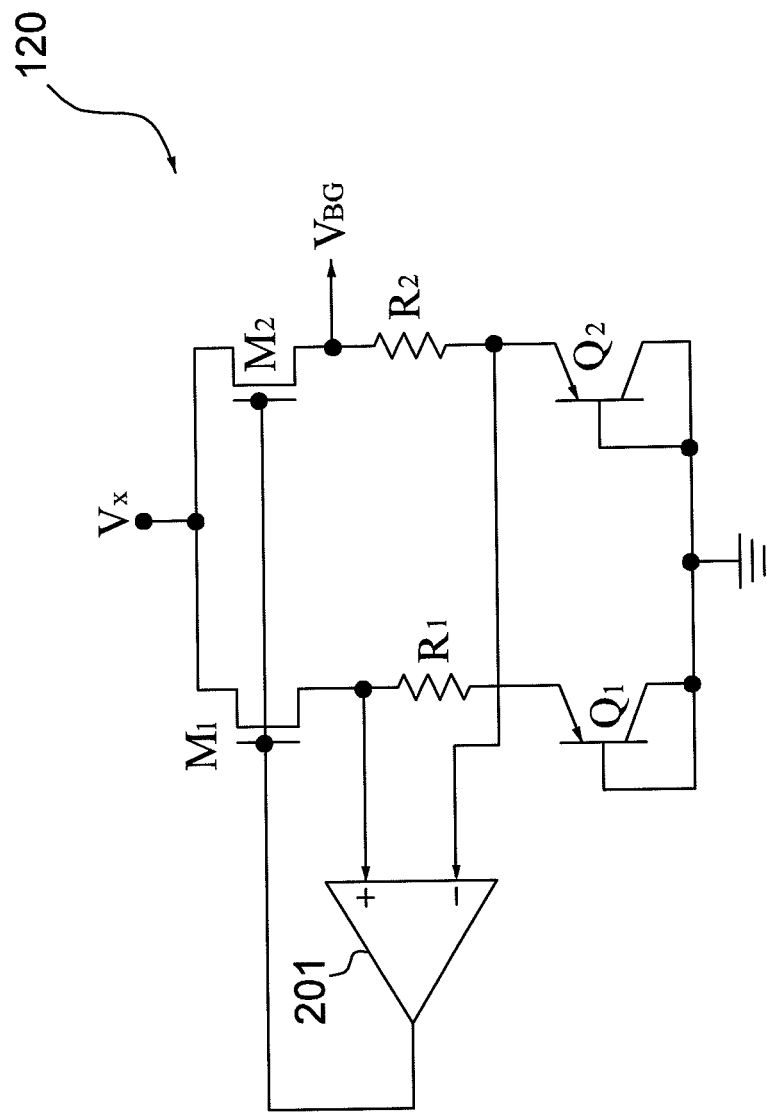
FIG. 2 shows a conventional band gap circuitry.

The band gap circuitry 120 and LDO voltage regulator circuitry 131-13N are well known in the analog circuit design. To complete the description of the circuit for rechargeable battery system, we shall briefly address in the followings:

A conventional band gap circuitry 120 is shown in FIG. 2. The band gap circuitry 120 is biased with the voltage $V_X$ of the charging capacitor $C_S$. The band gap circuitry 120 can be designed to be insensitive to temperature and functional in a wide range of biasing voltages. The band gap voltage $V_{BG}$ is equal to $[V_{BE}+(R_2/R_1)V_T \ln(A_1/A_2)]$, where $V_{BE}$ is the base-emitter voltage for the bipolar transistor $Q_2$, $V_T$ is the thermal voltage, and $A_1$ and $A_2$ are the emitter areas of Q1 and Q2, respectively. The minimal supply voltage can be expressed by as min $\{V_X\}=V_{BG}+V_{SDsat}$. The value of $V_{SDsat}$ ranges from 0.1 to 0.3 volts. Therefore, for a band gap voltage $V_{BG}$ of 1.2 volts, the minimal supply voltage to keep the band gap circuitry 120 functional properly is around 1.5 volts, which is smaller than the cut-off voltage $V_{cmin}$.

Figure 3:
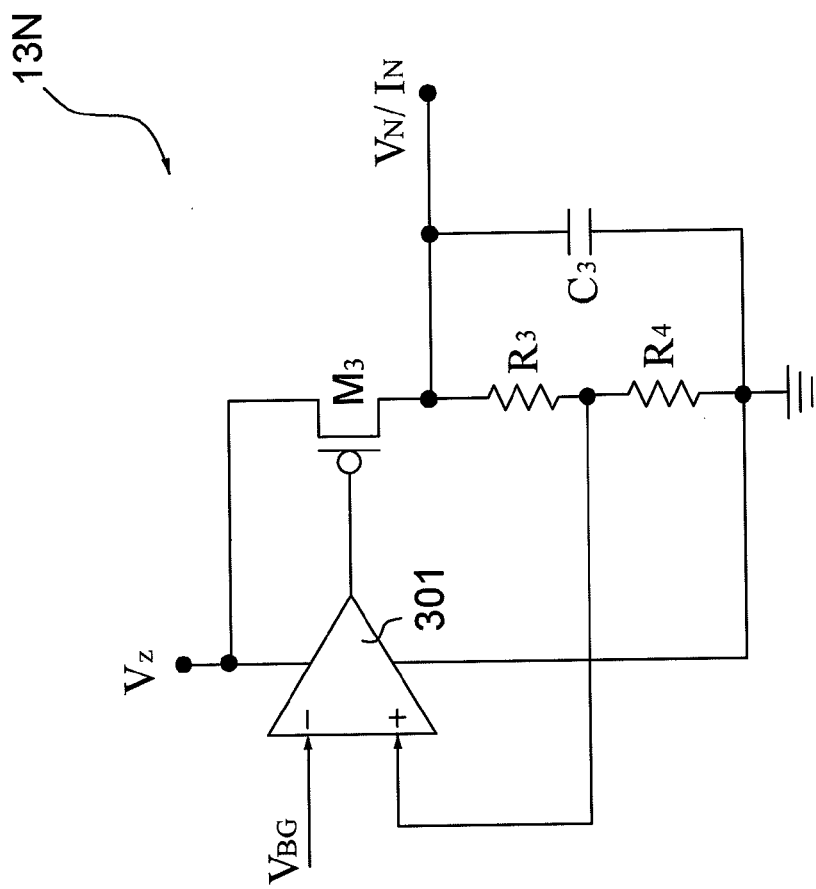
FIG. 3 shows a conventional Low-Drop-Out (LDO) voltage regulator for output voltage and driving current.

The main function of a LDO voltage regulator (131-13N) is to stabilize the voltage output under various current loading. A conventional LDO voltage regulator 13N is shown in FIG. 3. An operational amplifier 301 in FIG. 3 senses the output voltage $V_N$ through the feedback network $R_3$ and $R_4$ and compares with the band gap voltage $V_{BG}$. The output of the operational amplifier 301 is used to control the power P-type MOSFET $M_3$ to maintain a steady voltage output. Each LDO voltage regulator (131-13N) can be designed according to their output specification of voltage levels and driving current capabilities. Thus, the rechargeable battery (100A, 100B) of the invention is able to provide either a single power source output or multiple power source outputs by adding various LDO voltage regulator circuitries.

In summary, we have disclosed the rechargeable battery comprising the Integrated Circuit (IC) and the high capacitance density capacitor. The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations in circuitries and types of capacitors will be apparent to practitioners skilled in this art. It is intended that the scope of the invention be defined by the claims appended hereto and their equivalents in which all terms are meant in their broadest reasonable sense unless otherwise indicated. It should be appreciated that variations in integrating circuitry and type of capacitors may be made in the embodiments described by persons skilled in the art without departing from the scope of the present invention as defined by the following claims.

What is claimed is:

1. A rechargeable battery, comprising:
a renewable energy storage device coupled to a high density capacitor and an integrated circuit:

the high density capacitor connected between a reference voltage terminal and a first node carrying a first voltage; and the integrated circuit comprising:

a band gap circuit for generating a band gap voltage according to the first voltage;

a first detecting unit for measuring the first voltage according to an input charging voltage and determining whether to apply the input charging voltage to the high density capacitor;

the first detecting unit comprising a first comparator for comparing the input charging voltage with the first voltage to generate a first control signal; and a first switch for connecting the first node with an input terminal carrying the input charging voltage according to the first control signal;

a voltage divider connected in parallel to the high density capacitor and having a second node carrying a second voltage;

a second detecting unit for measuring the second voltage according to the band gap voltage and determining whether to connect a third node to the first node;

the second detecting unit comprising a second comparator for comparing the band gap voltage with the second voltage to generate a second control signal; and a second switch for connecting the first node to the third node according to the second control signal; and at least one low dropout voltage regulator, each being connected to the third node and generating a specified voltage output and a specified current output according to the band gap voltage and the first voltage;

wherein an amount of charge[s] stored by the high density capacitor after fully charged is given by $Q=C\times(V_{chg}-V_{min})$, where C denotes a capacitance of the high density capacitor, $V_{chg}$ denotes a magnitude of the input charging voltage and $V_{cmin}$ denotes a predetermined minimum of the first voltage that the third node remains connected with the first node.

2. The rechargeable battery according to claim 1, wherein the voltage divider comprises at least two capacitors connected in series and the second node is formed by the at least two capacitors.

3. The rechargeable battery according to claim 1, wherein the voltage divider comprises at least two resistors connected in series and the second node is formed by the at least two resistors.

4. The rechargeable battery according to claim 1, wherein when the first voltage is less than the input charging voltage, the input charging voltage is provided to charge the high density capacitor by the first switch, otherwise, the high density capacitor stops charging.

5. The rechargeable battery according to claim 1, wherein when the second voltage is greater than the band gap, the first node is connected with the third node, otherwise, the first node is disconnected from the third node.

6. The rechargeable battery according to claim 1, wherein the high density capacitor and the integrated circuit are manufactured separately in two different semiconductor substrates the first semiconductor substrate is different from the second semiconductor substrate.

7. The rechargeable battery according to claim 1, wherein the high density capacitor and the integrated circuit are integrated in a same semiconductor substrate.

8. The rechargeable battery according to claim 1, wherein when the third node is connected with the first node, a minimum of the second voltage is greater than the band gap voltage.

9. The rechargeable battery according to claim 1, wherein the reference voltage terminal is a ground terminal.

10. An operating method of a rechargeable battery, the rechargeable battery at least comprising a renewable energy storage device coupled to a high density capacitor, a voltage divider and at least one low dropout voltage regulator, the high density capacitor being connected between a reference voltage terminal and a first node carrying a first voltage, the voltage divider being arranged in parallel to the high density capacitor and having a second node carrying a second voltage, the method comprising the steps of:

measuring the first voltage according to an input charging voltage and determining whether to apply the input charging voltage to the high density capacitor, wherein the step of measuring the first voltage comprises comparing the input charging voltage with the first voltage and when the input charging voltage is greater than the first voltage, providing the input charging voltage to charge the high density capacitor;

generating a band gap voltage according to the first voltage;

measuring the second voltage according to the band gap voltage and determining whether to supply the first voltage to the at least one low dropout voltage regulator, wherein the step of measuring the second voltage comprises comparing the band gap voltage with the second voltage, and when the second voltage is greater than the band gap voltage, supplying the first voltage to the at least one low dropout voltage regulator; and when the first voltage is supplied to the at least one low dropout voltage regulator, respectively generating the specified voltage outputs and specified current outputs according to the band gap voltage and the first voltage by means of the at least one low dropout voltage regulator;

wherein an amount of charges stored by the high density capacitor after fully charged is given by $Q=C\times(V_{chg}-V_{min})$, where C denotes a capacitance of the high density capacitor, $V_{chg}$ denotes a magnitude of the input charging voltage and $V_{cmin}$ denotes a predetermined minimum of the first voltage that is allowed to be provided to the at least one low dropout voltage regulator.

11. The method according to claim 10, wherein the voltage divider comprises at least two capacitors connected in series and the second node is formed by the at least two capacitors.

12. The method according to claim 10, wherein the voltage divider comprises at least two resistors connected in series and the second node is formed by the at least two resistors.

13. The method according to claim 10, wherein the high density capacitor, the voltage divider and the at least one low dropout voltage regulator are integrated in a same semiconductor substrate.

14. The method according to claim 10, wherein the high density capacitor is manufactured separately in a different semiconductor substrate from the voltage divider and the at least one low dropout voltage regulator.

15. The method according to claim 10, wherein when the first voltage is supplied to the at least one low dropout voltage regulator, a minimum of the second voltage is greater than the band gap voltage.

16. The method according to claim 10, wherein the reference voltage terminal is a ground terminal.

* * * * *